(Model.)
P. R. GRABILL.
GRAIN WEIGHING SCALES.
No. 403,748. Patented May 21, 1889.
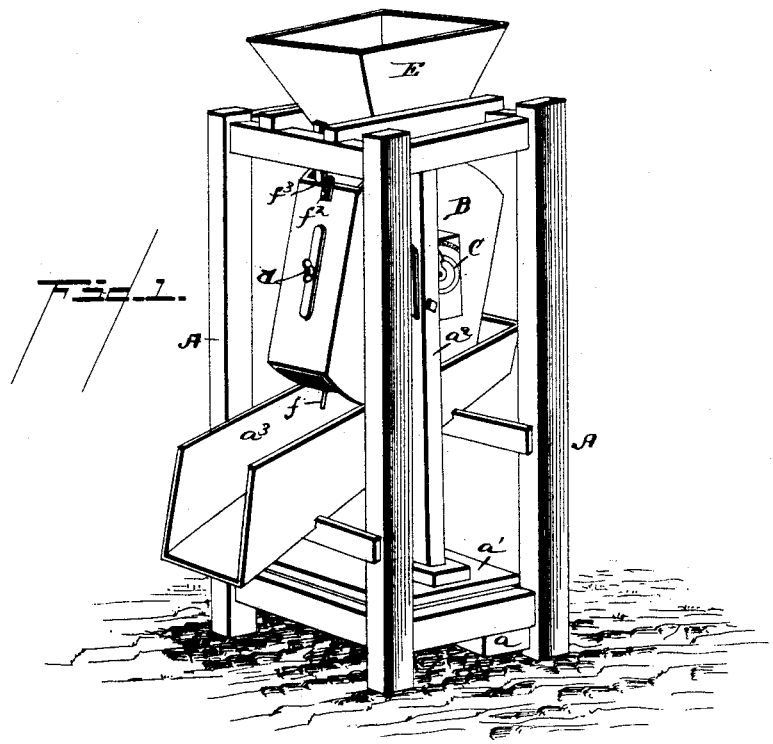

(Model.)　　　　　　　　　　　　　　　　　3 Sheets—Sheet 2.
P. R. GRABILL.
GRAIN WEIGHING SCALES.
No. 403,748.　　　　　　　　　　　Patented May 21, 1889.
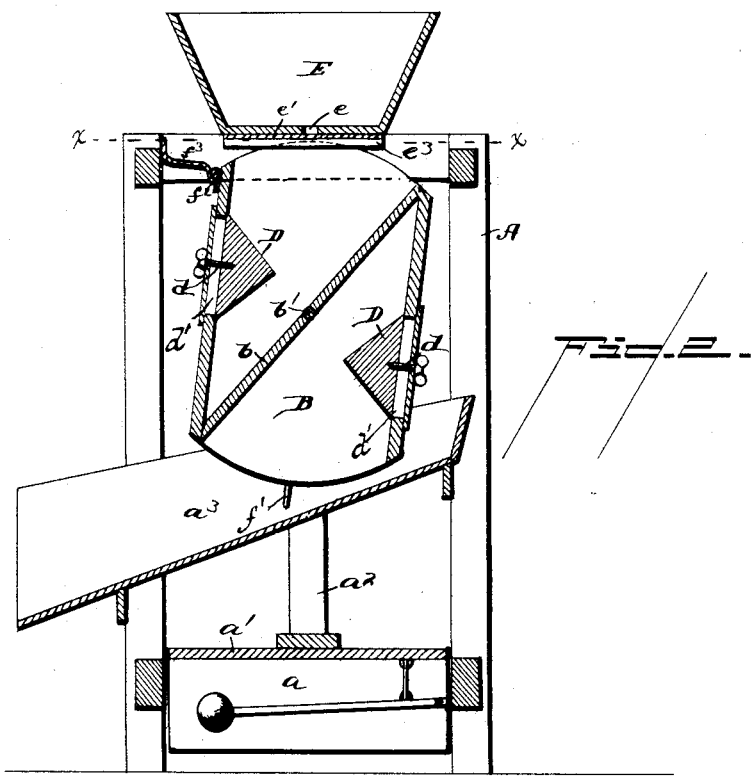
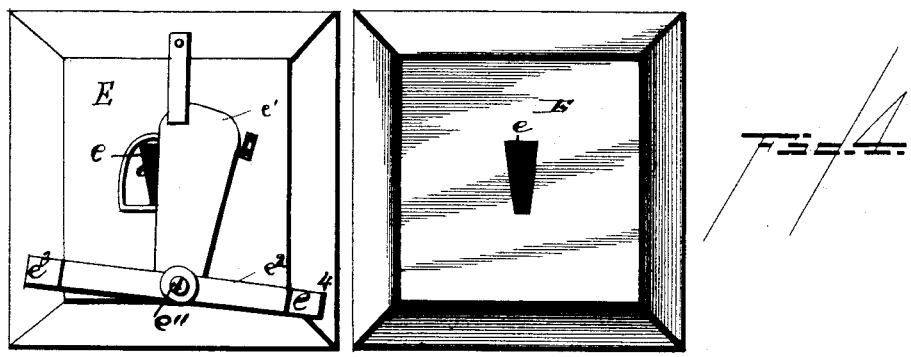

(Model.)
P. R. GRABILL.
GRAIN WEIGHING SCALES.
No. 403,748.  Patented May 21, 1889.
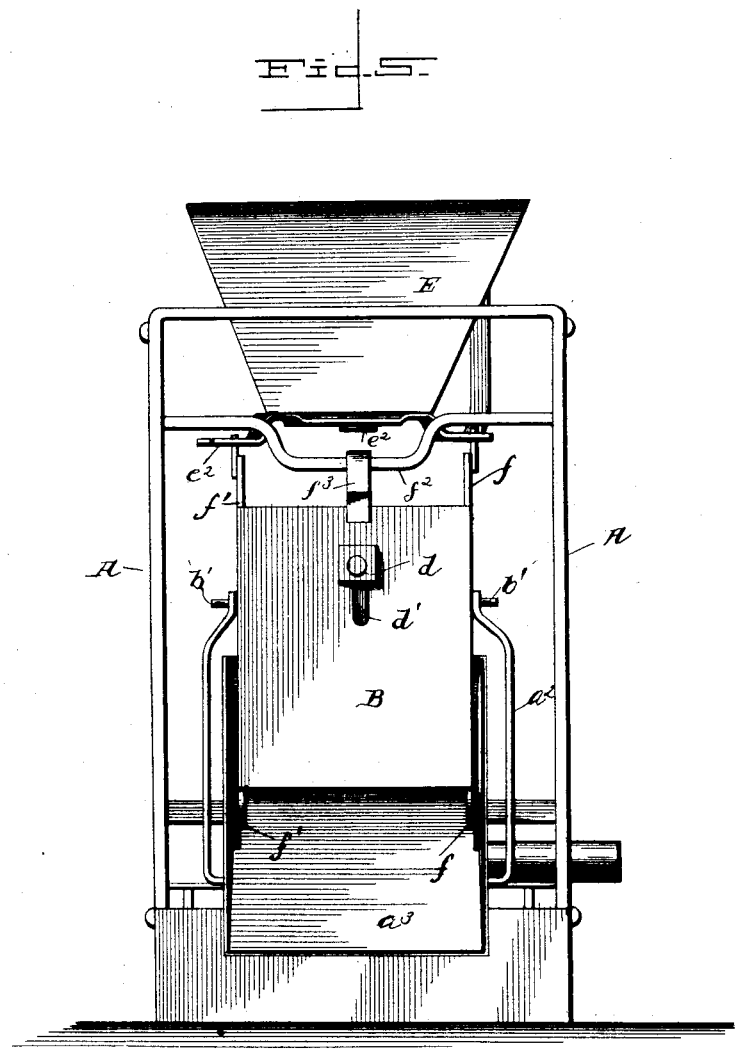

United States Patent Office.

PHARES R. GRABILL, OF MILLERSBURG, PENNSYLVANIA.

GRAIN-WEIGHING SCALES.

SPECIFICATION forming part of Letters Patent No. 403,748, dated May 21, 1889.

Application filed August 16, 1888. Serial No. 282,897. (Model.)

*To all whom it may concern:*

Be it known that I, PHARES R. GRABILL, a citizen of the United States of America, residing at Millersburg, in the county of Dauphin and State of Pennsylvania, have invented certain new and useful Improvements in Automatic Weighing-Scales, of which the following is a specification, reference being had therein to the accompanying drawings.

This invention pertains to certain new and useful improvements in grain-meters, having for its object the provision of a new and improved highly efficient means for automatically effecting the measuring of grain; and the invention comprises the detail construction, combination, and arrangement of parts, substantially as hereinafter fully set forth, and particularly pointed out in the claims.

In the accompanying drawings, Figure 1 is a view in perspective of my improved grain-meter. Fig. 2 is a vertical sectional view thereof. Fig. 3 is a horizontal section on the line $x\ x$, Fig. 2. Fig. 4 is a bottom plan view of the hopper. Fig. 5 is a view in elevation looking at the scale in a plane at right angles to the plane of Fig. 2.

Referring to the drawings, A designates the frame or stand, within the base of which is disposed suitable scales, $a$, whereon is mounted a movable base-board, $a'$. To this base-board $a'$ are rigidly secured the lower ends of two uprights or posts, $a^2\ a^2$, and between the same projects an inclined chute, $a^3$, rigidly secured to suitable cross-beams of the frame A.

B is a vessel or receptacle provided with a diagonally-arranged partition-board, $b$, which extends from the ends of opposite sides thereof. Through the center of this vessel or receptacle is passed a rod or shaft, $b'$, pivotally mounted in the posts or uprights $a^2$. One end of this rod or shaft is projected through, so as to operate a tallying device, C, secured to the adjoining post $a^2$, whereby the movement of the vessel is registered.

To the inner side of each end wall of vessel B is secured a block or hollow chamber, D, from which projects a nutted rod, $d$, working in a slot, $d'$, of said vessel, whereby said blocks can be secured at the desired points. The object of this arrangement is to throw the center of gravity either higher or lower with relation to the pivotal point of vessel B by the shifting the contents thereof, and thus regulate the force of the dump of the said vessel.

E is the hopper mounted upon frame A, and beneath the opening $e$ in the bottom thereof works a cut-off, $e'$, which at its inner end is fast with a rod or bar, $e^2$, pivotally secured by a bolt, $e''$, to the bottom of the hopper. The outer end of this cut-off and also the rod or bar $e^2$ are guided or supported in their swinging movements by a curved guide-strip, $e^5$. The rod or bar $e^2$ is provided at its ends with lugs $e^3\ e^4$. To the opposite ends of each side of vessel B are secured lugs or projections $f\ f'$, the former being designed to strike against the lug $e^3$ of rod or bar $e^2$, to effect the opening of the cut-off, and the latter, $f'$, to strike against the lug $e^4$ to close said cut-off. A second lug or projection, $f^2$, is secured to the vessel B, and is designed to engage a friction-roller, $f^3$, of frame A, whereby said vessel is held steady while being filled. In practice, when the lug $f^2$ of vessel B is in engagement with the friction-roller $f^3$, the cut-off is displaced from beneath the opening in the bottom of the hopper, and upon sufficient grain being received in said vessel the base-board $a'$ will lower, said vessel being now sufficiently heavy to counterbalance the weight at which scales $a$ are set. This will permit the tilting of the vessel B and the emptying of its contents into chute $a^3$, and at the same time the closing of the bottom of the hopper by lug $f'$ striking lug $e^4$ of rod or bar $e^2$, and when the vessel assumes its former position said bottom of the hopper will be opened as before by lug $f$ striking against lug $e^3$, and the grain is deposited into said vessel at the end opposite to that at which before deposited. The turning of the vessel will operate the tallying device, as is obvious.

I claim as my invention—

1. The vessel or receptacle having the diagonally-arranged board and the blocks or hollow chambers adjustably secured to said vessel, substantially as shown and described.

2. The combination of the frame, the movable base-board, the scales, the uprights or posts, the pivoted vessel or receptacle having the blocks or weights, the tallying device, the hopper having the swinging bottom, and the pivoted rod or bar, substantially as shown and described.

In testimony whereof I affix my signature in presence of two witnesses.

PHARES R. GRABILL.

Witnesses:
 JOHN W. PENROSE,
 JAMES LIGHT.